United States Patent
Larosa et al.

(10) Patent No.: US 9,461,534 B2
(45) Date of Patent: Oct. 4, 2016

(54) WIRELESSLY ACTIVATED POWER SUPPLY FOR AN ELECTRONIC DEVICE

(71) Applicant: STMicroelectronics S.r.l., Agrate Brianza (IT)

(72) Inventors: Roberto Larosa, Catania (IT); Giulio Zoppi, Palermo (IT); Natale Aiello, Trecastagni (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 30 days.

(21) Appl. No.: 14/664,962

(22) Filed: Mar. 23, 2015

(65) Prior Publication Data

US 2015/0194876 A1    Jul. 9, 2015

Related U.S. Application Data

(63) Continuation-in-part of application No. 13/969,637, filed on Aug. 19, 2013, now Pat. No. 9,071,158.

(30) Foreign Application Priority Data

Aug. 21, 2012 (IT) .............................. MI2012A1436

(51) Int. Cl.
  *H02M 1/36* (2007.01)
  *H02M 3/335* (2006.01)
  (Continued)

(52) U.S. Cl.
  CPC ................ *H02M 1/36* (2013.01); *H02J 9/005* (2013.01); *H02M 3/33523* (2013.01); *H02M 2001/0006* (2013.01); *H02M 2001/0032* (2013.01); *Y02B 70/16* (2013.01)

(58) Field of Classification Search
  CPC ............. H02M 3/33523; H02M 1/36; H02M 2001/0032; H02M 2001/0006; Y02B 70/16; H02J 9/005; G06K 7/10544

USPC ........ 363/16–17, 21.07, 21.08, 21.12, 21.17, 363/21.18; 235/462.11, 462.25, 462.36
See application file for complete search history.

(56) References Cited

U.S. PATENT DOCUMENTS 5,621,203 A * 4/1997 Swartz ............... G06K 7/10584
                                                      235/462.11
5,914,865 A     6/1999 Barbehenn et al.
(Continued)

FOREIGN PATENT DOCUMENTS

| EP | 1239577 A2 | 9/2002 |
|---|---|---|
| WO | WO-0036830 A1 | 6/2000 |
| WO | WO-2006011032 A1 | 2/2006 |

OTHER PUBLICATIONS

Italian Search Report and Written Opinion dated Apr. 25, 2013 for IT MI2012A001436 (7 pages).

*Primary Examiner* — Rajnikant Patel
(74) *Attorney, Agent, or Firm* — Gardere Wynne Sewell LLP (57) ABSTRACT

A power supply includes a power supply circuit and a power-on circuit controlling transitioning of the power supply circuit to a turned-on state. The power-on circuit includes a code driver, a controller coupled to the power supply circuit and code driver, and a transducer to detect a wireless control signal and generate an enable signal based thereupon. A transistor has a first conduction terminal coupled to the code driver, a second conduction terminal coupled to the controller, and a control terminal coupled to the transducer to receive the enable signal so the transistor switches based thereupon. The code driver detects a code embedded in the wireless control signal based upon switching of the transistor, and generates a power on signal for the controller based upon the code. The controller causes the power supply circuit to transition from the turned-off state to the turned-on state based upon the power on signal.

14 Claims, 7 Drawing Sheets

(51) Int. Cl.
*H02J 9/00* (2006.01)
*H02M 1/00* (2006.01)

(56) References Cited

U.S. PATENT DOCUMENTS

| | | |
|---|---|---|
| 6,252,783 B1 | 6/2001 | Huh et al. |
| 6,621,063 B2 * | 9/2003 | McQueen .......... G06K 7/10722 235/462.11 |
| 7,124,950 B2 * | 10/2006 | Blake .................. G06K 7/10851 235/462.36 |
| 7,840,142 B2 | 11/2010 | Keller |
| 7,880,393 B2 | 2/2011 | Wong et al. |
| 8,397,992 B2 * | 3/2013 | Longacre, Jr. ...... G06K 7/10544 235/462.25 |
| 8,587,595 B2 * | 11/2013 | Wang .................. G06K 7/10722 235/462.01 |
| 8,933,592 B2 | 1/2015 | Aiello |

* cited by examiner

WIRELESSLY ACTIVATED POWER SUPPLY FOR AN ELECTRONIC DEVICE

RELATED APPLICATION

This application is a Continuation-In-Part of U.S. patent application Ser. No. 13/969,637, filed Aug. 19, 2013, which claims priority from Italian Application for Patent No. MI2012A001436, filed on Aug. 21, 2012, the disclosures of which are hereby incorporated by reference in their entirety.

TECHNICAL FIELD

The present disclosure relates to a power supply for an electronic device.

BACKGROUND

As is known, many electrical or electronic appliances envisage a slow-consumption mode of operation, referred to as "stand-by mode". In this mode, the electrical appliance is inactive as regards its normal operation (for example, display of images for a television set, sound reproduction for hi-fi equipment, etc.) but can be controlled in switching-on through a remote control. As is generally known, an electrical appliance in stand-by mode is in any case supplied through the electric-supply mains, such as domestic power. The energy consumption is due to the presence of a microcontroller, configured to receive and process possible commands issued by a remote controller and supplied for this purpose.

Considerable efforts have been made in the last years to limit current consumption in stand-by mode of electrical appliances, which, so far, generally have levels of consumption of a few watts. However, it is evident that, if the consumption in stand-by mode of a plurality of electrical appliances generally present in dwellings is considered, non-negligible daily consumption levels may be reached.

Figure 1:
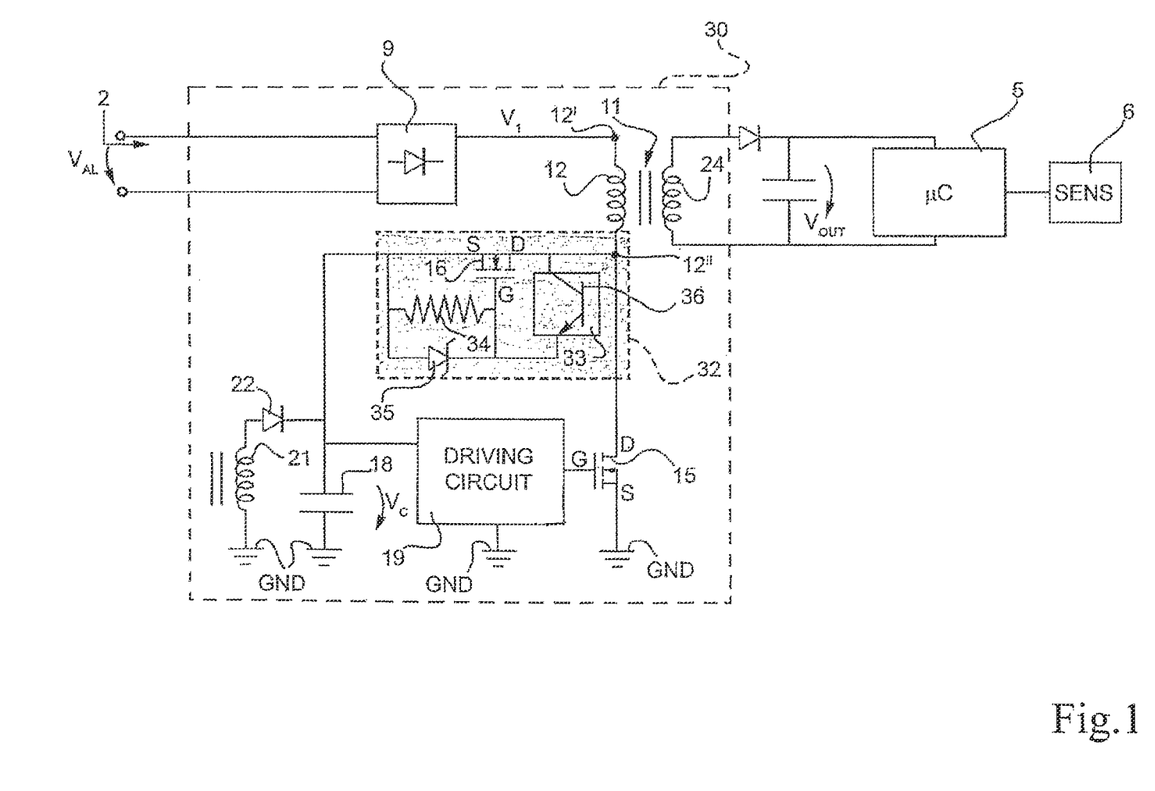
FIG. 1 shows a switch-mode power supply circuit of a known type for managing remote turning-on of an electrical appliance.

It is known from PCT Application No. WO2010/106113 (the disclosure of which is incorporated by reference), and shown in FIG. 1 herein, a power supply circuit for an electrical appliances. The power supply circuit 30 in FIG. 1, in particular a switch-mode power supply (SMPS) circuit of a flyback type, comprises a remotely activated start-up circuit 32 connected to a capacitor 18, which is in turn connected to a ground reference voltage GND. The start-up circuit 32 comprises a turn-on transistor 15 and a transducer 33, which can be remote-controlled and is configured to power-on, when activated, passage of a current there though. The transducer 33 is connected between a drain terminal D and a gate terminal G of the turn-on MOS transistor 15. The transducer 33 can be a photodiode configured so as to power-on passage of a current through it if activated by a light beam at a particular wavelength or within a range of wavelengths. The start-up circuit 32 also comprises a turn-off resistor 34 connected between the gate terminal G and the source terminal S of the turn-on transistor 15; finally a Zener diode 35 is connected between the gate terminal G and the source terminal S of the turn-on transistor 15, in parallel to the turn-off resistor 34.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

One aspect of the present disclosure is to provide a power supply apparatus wherein the circuit performances are improved with respect to the prior art. Particularly the power supply apparatus provides improved circuit performances of the power-on circuit of the power supply apparatus itself.

One aspect of the present disclosure is a power supply apparatus for an electrical appliance comprising a power supply circuit and a power-on circuit of the power supply circuit, said power-on circuit being configured for determining a transition from a turned off state, wherein said power supply circuit is off and does not supply electric power, to a turned on state of said power supply circuit, said power-on circuit comprising a transducer of a remote-controlled type configured to provide an power-on signal to trigger said transition in response to a reception of a wireless signal, said power-on circuit comprising a switch arranged in the electric path between an external DC supply line and the output terminal of the power-on circuit, said switch being driven by the transducer, wherein said power-on circuit comprises a capacitor arranged between the output terminal of the transducer and the driving terminal of the switch and configured so that the switch is not DC coupled with the transducer.

A power supply includes a power supply circuit, and a power-on circuit configured to control transitioning of the power supply circuit from a turned-off state to a turned-on state. The power-on circuit includes a code driver, a controller coupled to the power supply circuit and the code driver, and a transducer configured to detect a wireless control signal and to generate an enable signal based thereupon. The power-on circuit also includes a transistor having a first conduction terminal coupled to the code driver, a second conduction terminal coupled to the controller, and a control terminal coupled to the transducer to receive the enable signal such that the transistor switches based thereupon. The code driver is configured to detect a code embedded in the wireless control signal based upon switching of the transistor, and to generate a power on signal for the controller based upon the code. The controller is configured to cause the power supply circuit to transition from the turned-off state to the turned-on state based upon receipt of the power on signal.

The code driver may include an optocoupler. The power-on circuit may also include a resistor coupled between the code driver and a supply voltage, and may include a capacitor coupled between the transducer and the control terminal of the transistor. In addition, the transducer includes a reverse biased photodiode activated by an infrared beam.

The first conduction terminal may be a drain terminal, the second conduction terminal may be a source terminal, and the control terminal may be a gate terminal. The power-on circuit may also include a zener diode coupled between the control terminal and second conduction terminal of the transistor.

Another aspect is directed to a method that includes detecting a wireless control signal and generating an enable signal based thereupon, using a transducer. A code embedded in the wireless control signal is detected. A controller is powered based upon the enable signal. A power supply circuit is transitioned from a turned-off state to a turned-on state based upon detection of the code, by the controller.

DETAILED DESCRIPTION

One or more embodiments of the present disclosure will be described below. These described embodiments are only examples of the presently disclosed techniques. Additionally, in an effort to provide a concise description, all features of an actual implementation may not be described in the specification.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Like reference numbers in the drawing figures refer to like elements throughout, and reference numbers separated by century, as well as reference numbers with prime notation, indicate similar elements in other applications or embodiments.

Figure 2:
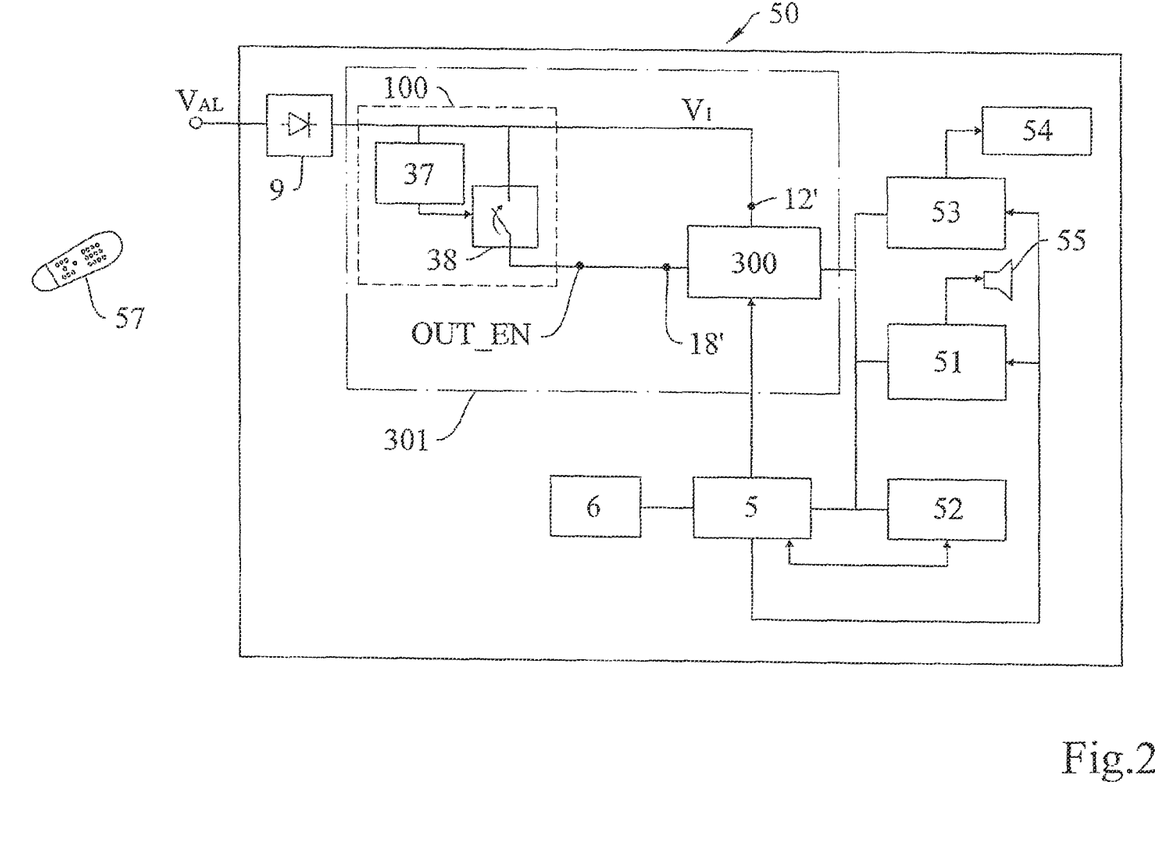
FIG. 2 shows a functional block diagram of an electrical appliance that implements a power supply apparatus.

FIG. 1 shows a power oscillator apparatus according to the present disclosure. FIG. 2 shows a functional block diagram of an electrical appliance 50 and a remote control 57. The electrical appliance 50 may, for example, be an audio/video system such as a television set, a hi-fi system, a video recorder, or an electrical household appliance in general, which implements a power supply apparatus 300. In particular, the remote control 57 is configured for issuing an appropriate power wireless signal for the remote activation of a transducer of the power supply apparatus 301, in order to turn-on the electrical appliance 50.

The electrical appliance 50 of FIG. 2 is supplied by means of the power supply apparatus 301 comprising a main power supply circuit 300, for example a switch-mode power supply (SMPS) circuit of a flyback type, coupled with the electric-supply line Val by means of a rectifier 9, for example a diode rectifier bridge with a filter capacitor. The rectifier 9 is connected to the supply line Val and outputs a DC working voltage V1 which is at the input supply terminal 12' of the main power supply circuit 300.

The power supply apparatus comprises a power-on circuit 100 of the power supply circuit 300. The power-on circuit 100 is arranged between the DC working voltage V1 and the power-on terminal 18' of the power supply circuit 300.

The power-on circuit 100 is preferably external to the supply circuit 300, but may be integrated with the same supply circuit 30, and is configured to provide a power on signal through an output terminal OUT_EN to the supply circuit 300 through said power on terminal 18', separated from said input supply terminal 12'.

The electrical appliance 50 then comprises: a microcontroller 5, which is connected to the power supply circuit 300 from which it receives the supply, and communicates with a command sensor 6; a sound-reproducing circuit 51, which is connected to the power supply circuit 300 from which it receives the supply, and communicates with the microcontroller 5 and with one or more loudspeakers 55; optionally a memory 52, which is connected to the power supply circuit 30 from which it receives the supply, and communicates with the microcontroller 5, for storing possible programming information of the electronic appliance 50; and, optionally, a video-reproducing circuit 53, which is connected to the power supply circuit 300 from which it receives the supply, and communicates with the microcontroller 5 and is configured for managing display of graphic information or images on a display 54.

The power-on circuit 100 processes the power on signal emitted by the remote control 57 so as to determine a transition from a turned off state, wherein said power supply circuit 300 is off and does not supply electric power, to a turned on state of said power supply circuit. The power-on circuit comprises a transducer 37 of a remote-controlled type configured to provide a power-on signal OUT_EN to trigger said transition in response to a reception of a wireless power signal deriving from the remote control 57.

Figure 3:
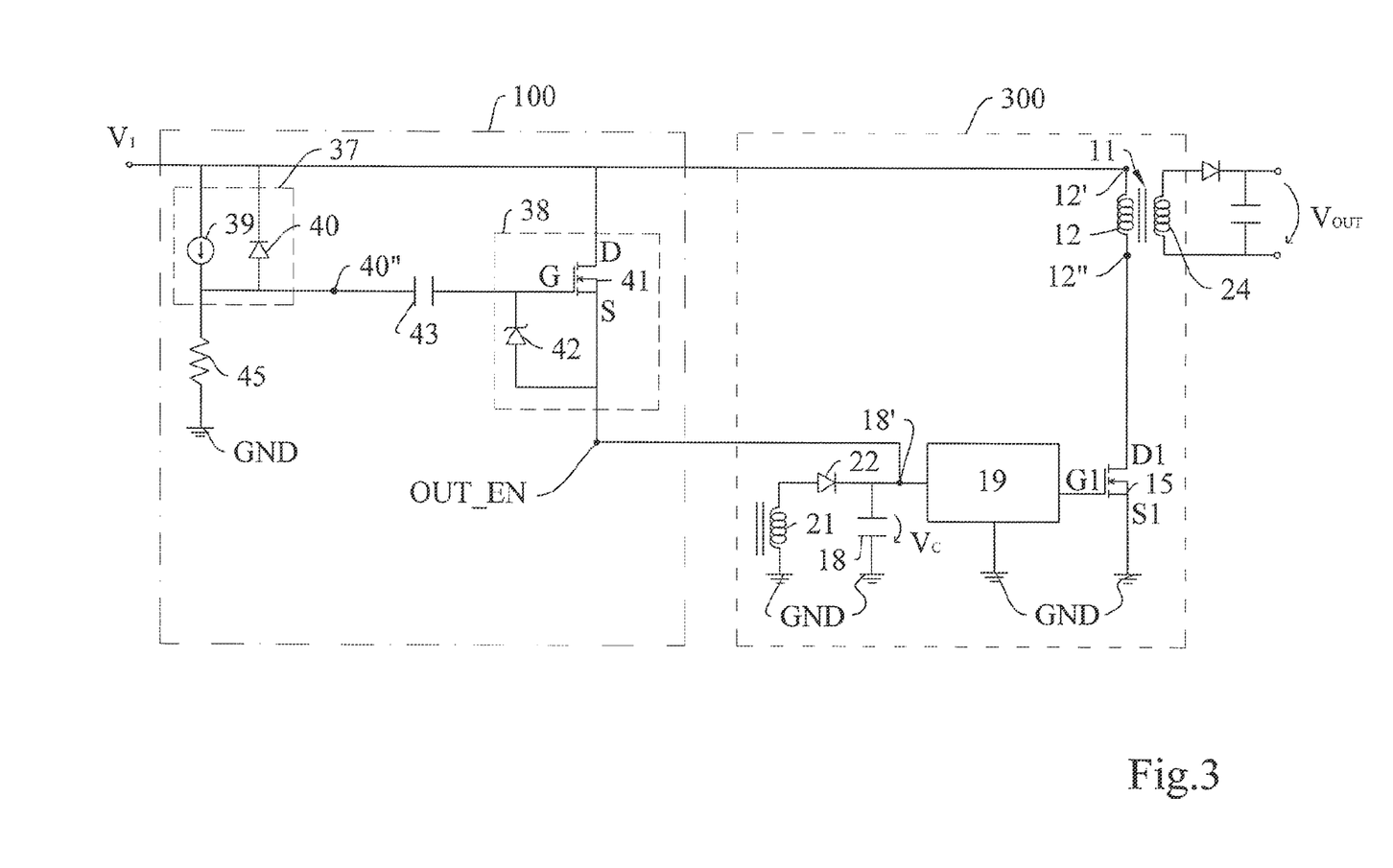
FIG. 3 shows a power supply apparatus for an electrical appliance according to a first embodiment of present disclosure.

FIG. 3 shows in more detail the power supply apparatus 301 for an electrical appliance according to a first embodiment of present disclosure. The DC working voltage V1 is supplied in input to the power supply circuit 300, particularly to a primary winding 12 of a transformer 11. The primary winding 12 comprises the terminal 12' connected to the rectifier 9 and another second terminal 12". The second terminal 12" is connected in series to a not drivable terminal D1 of a switch 15, for example the drain of a MOS device, the other not drivable terminal S1 (for example, the source) of which is connected to ground GND.

The switch 15 is controlled in conduction and interdiction by a driving circuit 19 the output terminal of which is connected with the drivable terminal G1, that is the gate terminal of the MOS transistor 15. The driving circuit 19 is moreover connected, through an input terminal thereof, to the input power-on terminal 18'; therefore the power-on circuit 100 directly controls the driving circuit 19 of the switching transistor of the supply circuit 300. A turn-on capacitor 18 is also connected between said power-on terminal 18' and ground GND; from said capacitor 18 the driving circuit 19 receives the supply during its turning-on step. The input terminal of the driving circuit 19 is moreover connected, via a rectifier diode 22, to an auxiliary winding 21 of the transformer 11, which supplies the driving circuit 19 during use, after the turning-on step.

The power-on circuit 100 comprises transducer 37, preferably a light sensor, which drives a switch 38; the switch 38 is connected between the DC supply line V1 and the output terminal OUT_EN, which is normally connected with the input terminal 18' of power supply circuit 300, particularly with the common terminal of the capacitor 18 and the input terminal of the driving circuit 19.

The light sensor 37 can be made either by a reverse biased photodiode, or a plurality of photodiodes connected in series one another, or a phototransistor configured so as to power-on passage of current across its terminals if activated by a light beam at a particular wavelength. For simplicity of description, in what follows reference will be made to a photodiode, more precisely which can be activated by an infrared beam.

The photodiode is modeled with a current generator 39, which takes account of the current generated by the infrared beam, in parallel with a diode 40 which describes internal recombination. The switch 38 is made with an high voltage transistor 41, for example of a MOSFET type, and a Zener diode 42, connected between the gate terminal G of the transistor 41 and the output terminal OUT_EN, being said Zener diode 42 able to limit the potential applied to the gate terminal G of the transistor 41 to a maximum value represented by the voltage VZENER, proper to the Zener diode 42.

A resistor 45 is connected between the gate terminal G of the transistor 41 and the ground GND, said resistor 45 being suitable to convert the current generated by the photodiode 37 into a voltage.

Finally the transformer 11 comprises a secondary winding 24 for generating on an output port of the power supply circuit 4 an output voltage VOUT that supplies the microcontroller 5 and others.

In use, with reference to FIG. 3, when the phototransistor 37 is driven in conduction by means of an incident light beam having a wavelength in the infrared, a current flows through it and a voltage develops across its terminal, biasing the gate terminal G of the transistor 41. If the biasing voltage generated by the resistor 45 is higher than the conduction threshold of the turn-on transistor 41, the transistor 41 turns on and the switch 38 closes; the DC working voltage V1 is now sent through the terminal OUT_EN to the input power-on terminal 18' of the supply circuit. In this way, the turn-on capacitor 18 is charged (FIG. 3) and, when the voltage on the turn-on capacitor 18 reaches a value VC sufficient to supply the driving circuit 19, the driving circuit 19 turns on and drives in conduction the switching transistor 15. Hence, the driving circuit 19 is supplied by the auxiliary winding 21.

After the turning-on step, the driving circuit 19 controls in conduction the switching transistor 15. In this way, a current flows through the primary winding 12 of the transformer 11 and supplies, via the auxiliary winding 21, the driving circuit 19 itself. In use, the switching transistor 15 can be controlled via square-wave modulation (pulse-width modulation—PWM) signal with variable frequency and power-on transfer onto the secondary winding 24 of the supply for operation of the microcontroller 5. The sound-reproducing circuit 51, the memory 52, the video-reproducing circuit 53, the display 54, and the loudspeakers 55 can be supplied by means of respective secondary windings (not illustrated) of the transformer 11 of the power supply circuit 30 of FIG. 2. The power-on circuit 100 comprises a capacitor 43 coupled between the transducer 37 and the switch 38, particularly to the output terminal 40" of the transducer 37 and the drivable terminal G of the switch 38, particularly the gate terminal G of the MOS transistor 41 of the switch 38; said capacitor 43 is configured so that the transducer 37 is not DC coupled with the switch 38, that is said capacitor 43 has a value such as to ensure that the switch 38, particularly the transistor 41, is not DC coupled with the transducer 37, in this way limiting the circuitry start-up due to the static environmental light.

Figure 4:
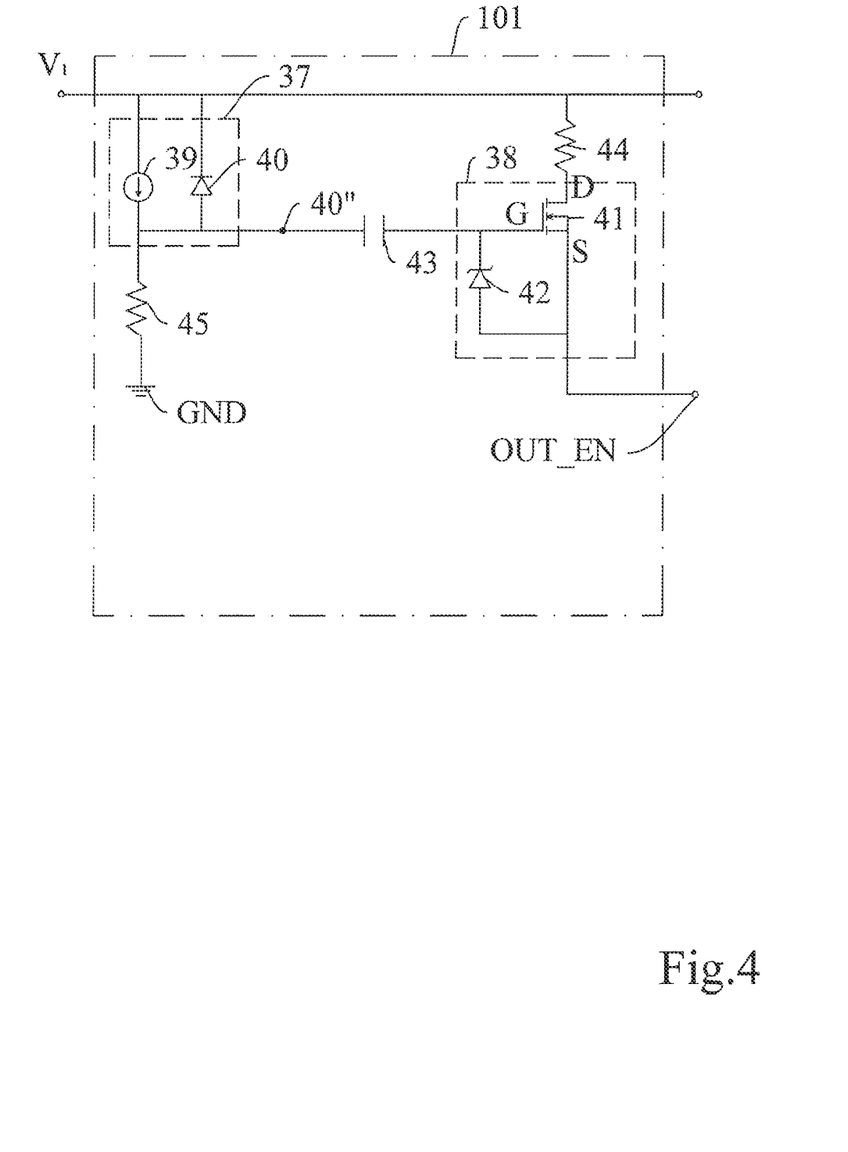
FIG. 4 shows only the power-on circuit of the power supply apparatus for an electrical appliance according to a second embodiment of present disclosure.

FIG. 4 shows only the power-on circuit 101 of the power supply apparatus for an electrical appliance according to a second embodiment of present disclosure; differently from the power-on circuit 101 in FIG. 3, the power-on circuit 101 comprises a resistor 44 connected to the DC supply voltage V1 and the drain terminal D of the transistor 41; the resistor 44 provides to pull up the output voltage at the terminal OUT_EN at small controlled steps, this for limiting the current into the capacitor 18 configured to develop a supply voltage VC adapted to turn on the power supply circuit 30. A definable number of voltage steps are so needed before the voltage at the input power-on terminal 18' is sufficient to start up the driving circuit 19. In this case, only a well-defined sequence of light events would start up the power supply circuit 30 and not any undesired dynamic light event. Thus, just adding a well-defined resistor 44 would give more immunity to the circuit against undesired light events.

Figure 5:
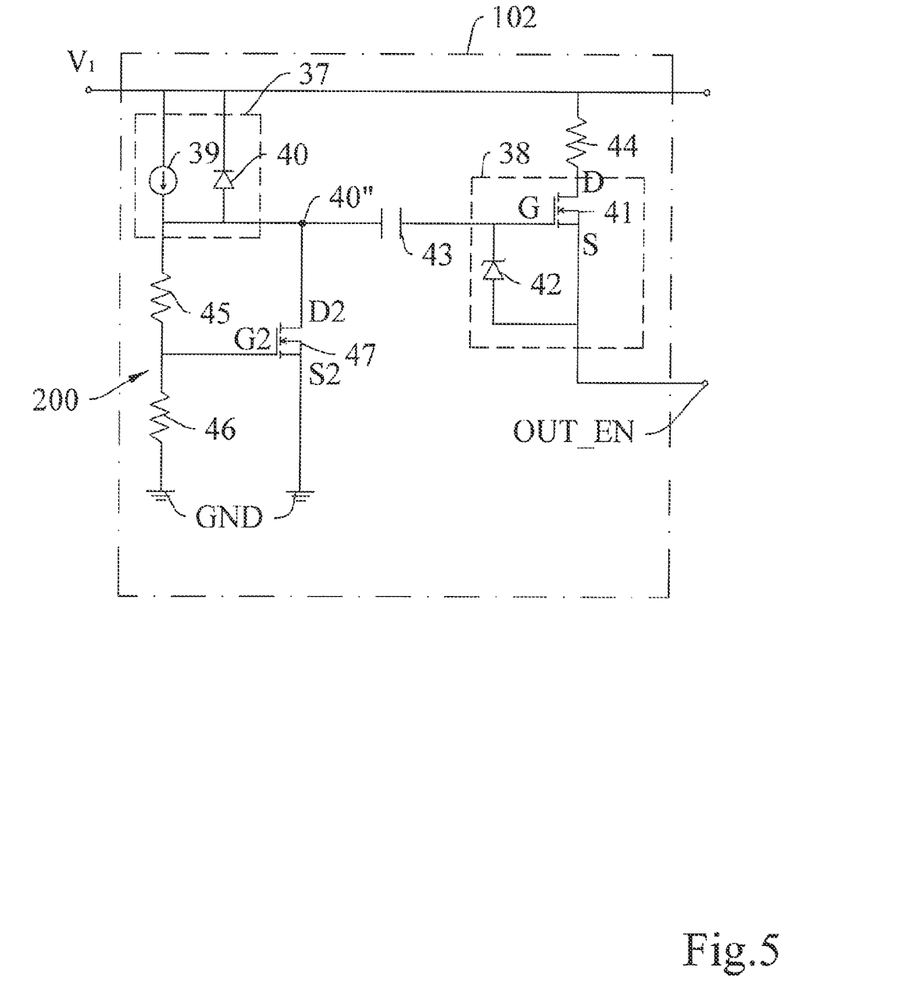
FIG. 5 shows only the power-on circuit of the power supply apparatus for an electrical appliance according to a third embodiment of present disclosure.

FIG. 5 shows only the power-on circuit 102 of the power supply apparatus for an electrical appliance according to a second embodiment of present disclosure; differently from the power-on circuit 101 in FIG. 4, the power-on circuit 102 solves the problem that in some environments, where the power light is so high, the voltage at the node 40" could reach the voltage value V1, thus saturating the receiver. In this case the system cannot respond to any further injection of light through the remote 57. The power-on circuit 102 comprises a negative feedback network 200 (FIG. 5) connected between the output terminal 40" of the transducer and ground GND; the negative feedback network 200 is implemented by adding in series to the resistor 45 a resistor 46 and connecting a transistor 47, for example a MOSFET, so that the gate terminal G2 of the MOS transistor 47 is connected with the common terminal of the resistances 45, 46, the source terminal S2 of the transistor 47 is connected to ground GND and the drain terminal D2 is connected to the terminal 40" of the transducer 37. Transistor 47 will turn on when the photo current is so high that the voltage value at its gate terminal G2 is higher than its voltage threshold. Thus transistor 47 will turn on only when the environment light is higher than a certain value that can be defined case by case. Once the transistor 47 is on, a negative feedback will keep down a node 40" and fixed to a given value. In fact, if the photo current increases also the voltage across the resistor 46 increases and the node 40" is pulled down by the transistor 47. The resistor 44, even if shown in FIG. 5, can belong or cannot belong to the power-on circuit 102.

With the proposed power-on circuit is possible to solve several problems in order to achieve a solid and reliable system able to work under the most diverse light environmental conditions, reducing to zero watt the power consumption of an electronic appliance when in stand-by mode.

Figure 6:
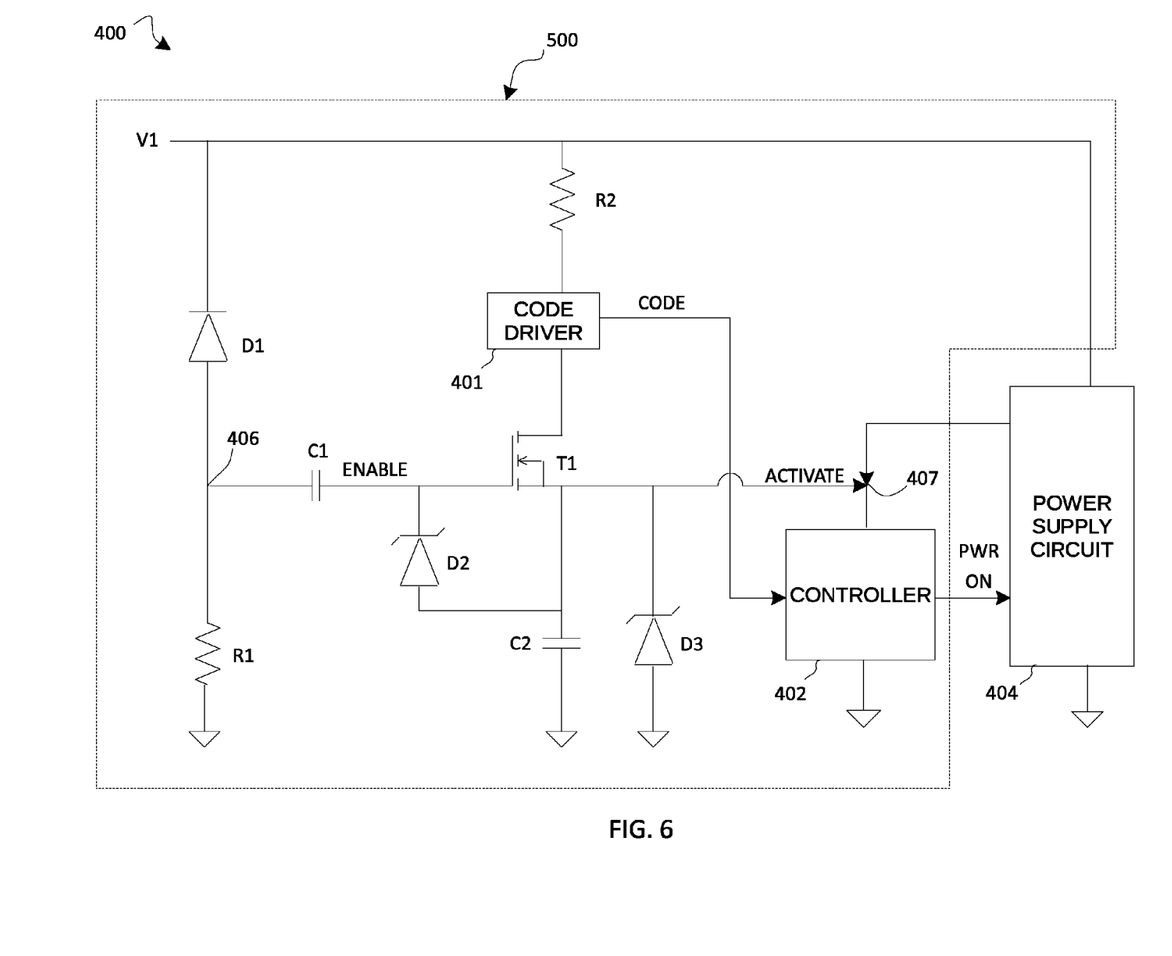
FIG. 6 is a schematic block diagram of an electronic device that includes a power supply apparatus of the present disclosure.

Yet further embodiments are now described with initial reference to FIG. 6. A power supply 400 includes a power-on circuit 500 that controls transitioning of a power supply circuit 404 from a turned-off state to a turned-on state. In other words, the power-on circuit 500 controls switching of the power supply circuit 404 on and off.

The power-on circuit 500 includes a transducer D1, such as a photodiode, plurality of photodiodes in series, or a phototransistor, coupled between a supply voltage V1 and a first node 406. A resistor R1 is coupled between the first node 406 and a reference voltage.

A dc-blocking capacitor C1 is coupled between the first node 406 and a transistor T1. The gate of the transistor T1 is coupled to the transistor C1 to thereby receive signals from the photodiode D1. The source of the transistor T1 is coupled to a reference voltage via a capacitor C2, and the drain of the transistor T1 is coupled to a code driver 401. The code driver 401 is coupled to the supply voltage V1 via a resistor R2, and the gate and the source of the transistor T1 are coupled together via the zener diode D2.

The code driver 401 is coupled to a controller 402, as is the source of the transistor T1 through a second node 407.

The controller 402 is coupled to the power supply circuit 404. A second zener diode D3 is coupled between second node 407 and the reference voltage.

Operation of the power-on circuit 400 will now be described. The photodiode D1 detects a wireless control signal in the infrared band and generates an enable signal based thereupon. The transistor T1 is activated based upon the enable signal from the photodiode D1, and in turn generates an activate signal passed to the controller 402 via the second node 407.

The wireless control signal has a code embedded therein, which will result in the photodiode D1 intermittently conducting. The intermittent conduction of the photodiode results in the transistor T1 switching on and off in succession. This switching on and off of the transistor T1 is read by the code driver 401, and therefrom the code driver 401 extracts the code embedded in the wireless signal. The controller 402 is supplied by the activate signal, and thus activates based upon the activate signal. Once the controller 402 receives the code from the code driver 401, the controller 402 generates a power-on signal to the power supply circuit 404 that causes the power supply circuit to turn on once the activate signal has reached a startup value for the power supply circuit 404.

The DC blocking capacitor C1 serves to block instances of the enable signal being generated as a result of the photodiode D1 detecting ambient light. The resistor R2 serves to cause the voltage of the activate signal to rise in small controlled steps by limiting the current when T1 is turned on to a value related to the voltage step associated with the activate signal, helping to eliminate generation of the activate signal at a sufficient voltage to turn on the controller 402 from undesirable light generating events. The zener diode D2 serves to limit the voltage applied to the gate of the transistor T1 to a safe value. Similarly, the zener diode D3 serves to limit the voltage applied to the controller 402 by the transistor T1 to a safe value.

The usage of the code driver 401 to cause the controller 402 to generate the power on signal eliminates the possibility of the power-on circuit erroneously turning the power supply circuit 404 on, since only detection of the code embedded in the wireless signal will result in the generation of the power on signal. This serves to add intelligence and robustness to the startup phase.

Figure 7:
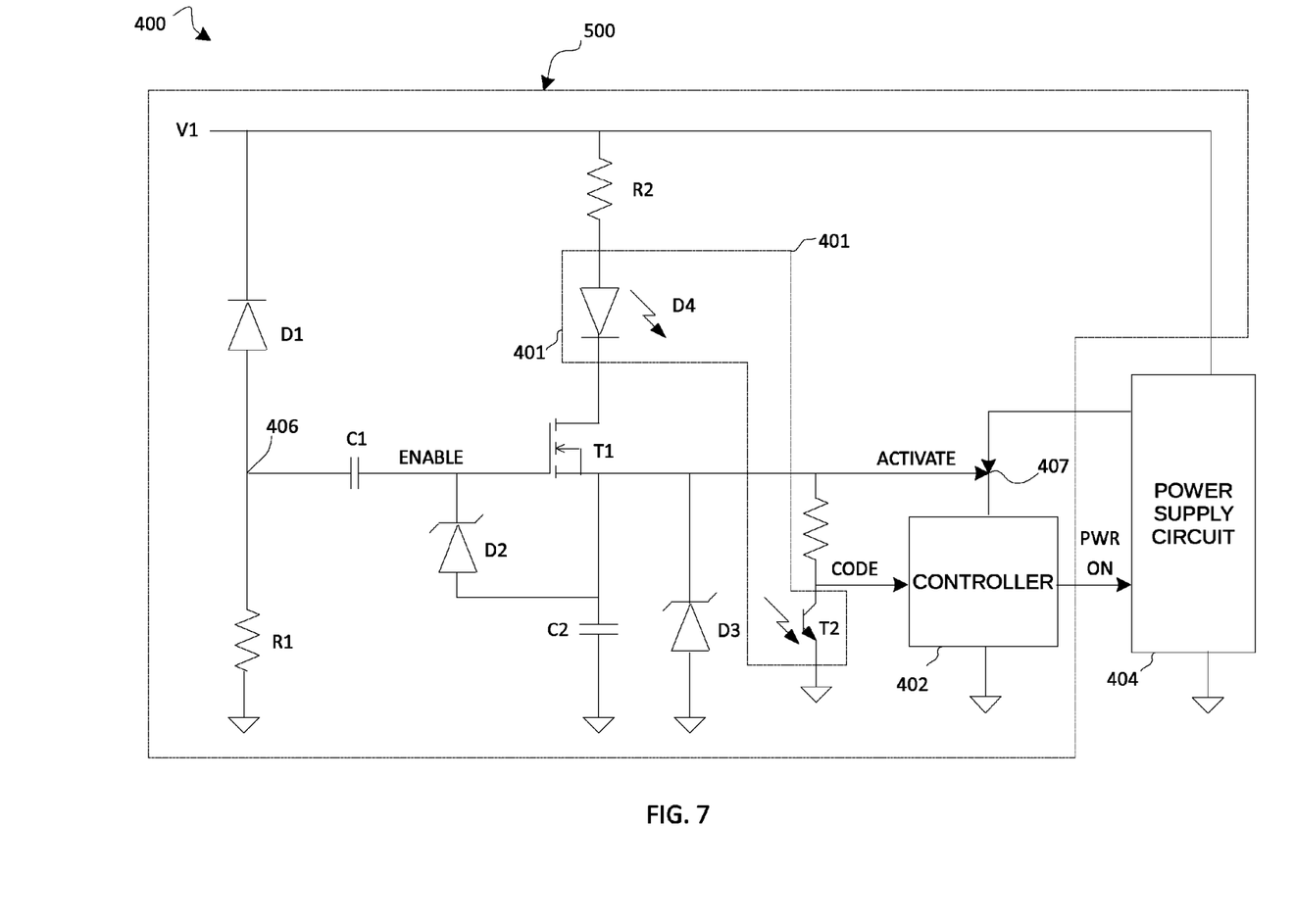
FIG. 7 is a schematic block diagram of another embodiment of an electronic device that includes a power supply apparatus of the present disclosure.

Another possible implementation of the power-on circuit 400 is shown in FIG. 7. Here, the code driver 401 is an optocoupler comprised of a light emitting diode D4 coupled between the resistor R2 and the drain terminal of the transistor, and a phototransistor T2 having a source coupled to the reference voltage, and a drain coupled to the controller 402. Alternatively, the code driver 401 may be a standard IR receiver supplied by the activate voltage. Operation of the power-on circuit 400 otherwise proceeds as described above.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A power supply, comprising:
   a power supply circuit;
   a power-on circuit configured to control transitioning of the power supply circuit from a turned-off state to a turned-on state, the power-on circuit comprising:
   a code driver;
   a controller coupled to the power supply circuit and the code driver;
   a transducer configured to detect a wireless control signal and to generate an enable signal based thereupon;
   a transistor having a first conduction terminal coupled to the code driver, a second conduction terminal coupled to the controller, and a control terminal coupled to the transducer to receive the enable signal such that the transistor switches based thereupon;
   wherein the code driver is configured to detect a code embedded in the wireless control signal based upon switching of the transistor, and to generate a power on signal for the controller based upon the code;
   wherein the controller is configured to cause the power supply circuit to transition from the turned-off state to the turned-on state based upon receipt of the power on signal.

2. The power supply of claim 1, wherein the code driver comprises an optocoupler.

3. The power supply of claim 1, wherein the power-on circuit further comprises a resistor coupled between the code driver and a supply voltage.

4. The power supply of claim 1, wherein the power-on circuit further comprises a capacitor coupled between the transducer and the control terminal of the transistor.

5. The power supply of claim 1, wherein the transducer comprises a reverse biased photodiode activated by an infrared beam.

6. The power supply of claim 1, wherein the first conduction terminal comprises a drain terminal, the second conduction terminal comprises a source terminal, and the control terminal comprises a gate terminal.

7. The power supply of claim 1, wherein the power-on circuit further comprises a zener diode coupled between the control terminal and second conduction terminal of the transistor.

8. An electronic device, comprising:
   a power supply circuit;
   a power-on circuit comprising:
   a code driver,
   a controller coupled to the power supply circuit and the code driver,
   a transducer, and
   a transistor having a drain terminal coupled to the code driver, a source terminal coupled to the controller, and a gate terminal coupled to the transducer.

9. The electronic device of claim 8, wherein the code driver comprises an optocoupler.

10. The electronic device of claim 8, wherein the power-on circuit further comprises a resistor coupled between the code driver and a supply voltage.

11. The electronic device of claim 8, wherein the power-on circuit further comprises a capacitor coupled between the transducer and the gate terminal of the transistor.

12. The electronic device of claim 8, wherein the transducer comprises a reverse biased photodiode activated by an infrared beam.

13. The electronic device of claim 8, wherein the power-on circuit further comprises a zener diode coupled between the gate terminal and source terminal of the transistor.

14. A method, comprising:
   detecting a wireless control signal and generating an enable signal based thereupon, using a transducer;
   detecting a code embedded in the wireless control signal;
   powering a controller based upon the enable signal; and
   transitioning a power supply circuit from a turned-off state to a turned-on state based upon detection of the code, using the controller.

* * * * *

UNITED STATES PATENT AND TRADEMARK OFFICE
CERTIFICATE OF CORRECTION

PATENT NO. : 9,461,534 B2
APPLICATION NO. : 14/664962
DATED : October 4, 2016
INVENTOR(S) : Roberto Larosa et al.

It is certified that error appears in the above-identified patent and that said Letters Patent is hereby corrected as shown below:

In the Specification

At Column 1, Line number 9, please replace the Italian application number [MI2012A001436] with -- MI2012A001436 --.

Signed and Sealed this
Twenty-eighth Day of February, 2017

Michelle K. Lee
*Director of the United States Patent and Trademark Office*